United States Patent [19]

Stashko

[11] Patent Number: 4,934,880
[45] Date of Patent: Jun. 19, 1990

[54] END MILL CUTTING TOOL

[75] Inventor: Daniel R. Stashko, Holly, Mich.

[73] Assignee: GTE Valenite Corporation, Troy, Mich.

[21] Appl. No.: 289,945

[22] Filed: Dec. 27, 1988

[51] Int. Cl.⁵ .............................................. B23P 15/28
[52] U.S. Cl. ..................................... 407/43; 407/114; 407/42
[58] Field of Search ...................... 407/42, 40, 48, 55, 407/113, 114, 59, 60, 61, 63

[56] References Cited

U.S. PATENT DOCUMENTS

| | | | |
|---|---|---|---|
| 4,090,801 | 5/1978 | Faber | 407/113 |
| 4,681,488 | 7/1987 | Markusson | 407/113 |
| 4,755,086 | 7/1988 | Stashko | 407/114 |

Primary Examiner—Frederick R. Schmidt
Assistant Examiner—Mark F. Frazier
Attorney, Agent, or Firm—David J. Koris

[57] ABSTRACT

An improved end mill and method of manufacture with an enhanced number of effective teeth. A unique segmented insert configuration maintains a positive axial rake in a negative rake seating face.

7 Claims, 1 Drawing Sheet

END MILL CUTTING TOOL

FIELD OF THE INVENTION

The present invention pertains to the field of end mill tooling and particularly to an improved end mill tool having an increased number of effective teeth.

BACKGROUND OF THE INVENTION

The manufacture of end mills for use with positive rake inserts has traditionally been accomplished by plunge cutting gullets in a direction generally tangent to the cylindrical periphery of a tool blank to a point where the plunge forms a 90 degree angle with respect to an imaginary line extending radially from the rotational axis. A disadvantage of this method is that an unnecessarily large amount of tool stock is removed thereby weakening the rises carrying the inserts. In addition, the length of the plunge, which forms the chip gullet and insert pocket, necessarily dictates the number of inserts which can be mounted peripherally. An end mill which utilized a shorter plunge length or chord while providing a positive rake cutting edge would therefore be a considerable advance in the art of cutting tools.

Another object of the present invention is to provide an end mill tool with enhanced pocket and body strength.

A further object of the present invention is to provide an end mill tool with chip gullets of reduced diameter which generate tight chip curls.

A further object of the present invention is to provide an end mill having an improved number of effective cutting teeth where the indexable inserts have positive axial rake cutting edges.

Another object of the present invention is to provide an end mill tool for cutting difficult to machine metals with ceramic inserts having positive rake cutting edges.

SUMMARY OF THE INVENTION

Accordingly, the present invention alleviates the before mentioned problems by providing an end mill cutting tool having a cylindrical body which is rotatable about a central axis. The body includes a shank, a head, and an end face. The head section includes a plurality of chip gullets or flutes which are helically disposed about the periphery of the tool and provide overlapping fields of cutting.

The cutting tool includes a plurality of recessed pockets milled into the rises of the body and opening into the chip gullets. Each pocket has at least two abutment walls which adjoin a negative rake angle seating face. A plurality of indexable cutting inserts are secured within pockets in a "stand-up" orientation. In one embodiment, the inserts comprise generally parallel top and bottom faces where the top face is separated from the bottom by at least two pair of opposite side surfaces wherein one pair comprises end clearance surfaces and the other pair comprises side flank surfaces. Each end clearance surface adjoins at least one of the pair of side flanks surfaces forming an obtuse angle. Each of the side flank surfaces further includes a first surface which intersects the bottom face at a 90 degree angle and a second surface which adjoins the first surface at an obtuse angle. The second surface extends inward toward the top face forming an acute angled cutting edge. Means are also provided for maintaining adequate heel clearance.

The top face is generally segmented with two inclined third surfaces which extend from a planar central face of the top face. The third surfaces form an obtuse angle with respect to the central face and lie either on or slightly below an imaginary line passing through the cutting edge and extending normal to the rotational axis to provide a neutral to positive axial rake cutting edge.

One advantage of the present invention therefore is the ability to incorporate a greater number of indexable inserts around the periphery of the tool. The angle at which the chip gullets is milled, resulting in a negative rake pocket seat, results in shorter chord lengths than where the chip gullet and pockets are milled to provide neutral or positive rake pocket seats. The shorter chord lengths allows for a greater number of inserts and therefore a greater number of effective teeth per tool.

Another advantage of the present invention is that a larger number of effective teeth may be incorporated without sacrificing a highly positive axial rake cutting edge or radial heel clearance.

Yet another advantage of the present invention is that a larger number of effective teeth may be provided without sacrificing either tool stiffness or pocket support beneath the insert.

Yet a further advantage of the present invention is that the present invention an method of making it are not restricted to end mill tools but may be easily applied to other types of tools such as face mills.

DETAILED DESCRIPTION OF A PREFERRED EMBODIMENT

Figure 1:
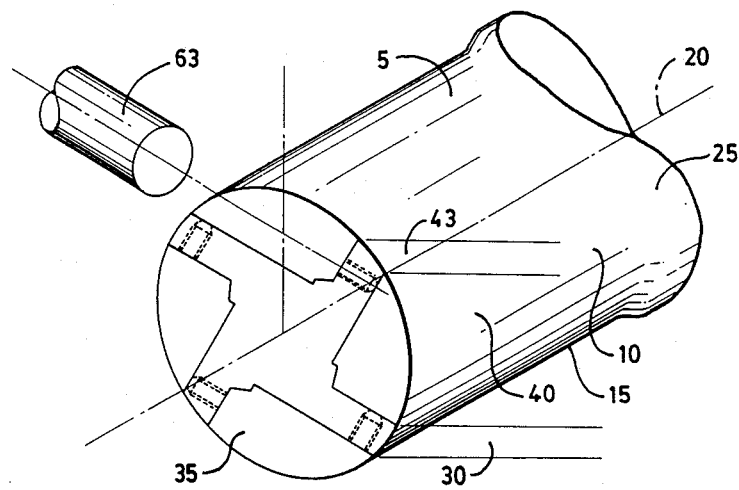
FIG. 1 illustrates a perspective view of tool stock being milled for chip gullet and pocket formation in accordance with the prior art.

The objects and advantages discussed above are achieved in the present invention as illustrated the Figures. FIG. 1, illustrating a prior art end mill, includes several features common with the present invention. For example, the end mill cutting tool 5 includes a body 10 generally cylindrical in form having a periphery 15. In operation, body 10 rotates about a centrally disposed axis 20. Body 10 includes contiguous shank 25, head 30 and end face 35. Helically disposed about the periphery 30 of body 10 are a number of concave flutes or chip gullets 40 separated by rises 43.

Although the present invention is equally applicable to other tools such as a face mill, an end mill is discussed hereunder.

Figure 2:
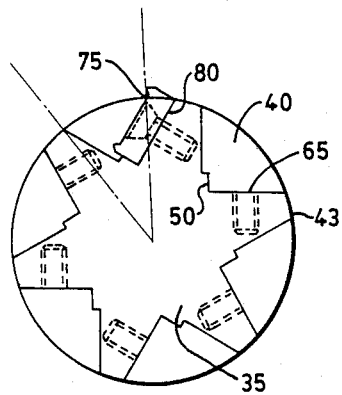
FIG. 2 illustrates an axial view of chip gullet and pocket formation of the present invention.

Referring to FIG. 2 illustrating one embodiment of the present invention, a helical array of recessed pockets 45 spaced axially in the rises 43 to provide overlapping fields of cutting, open out into the chip gullets 40. The gullets alternately extend through the end face 35. The particular angle of the helix is dependent on the diameter of the tool, the size of the insert and the number of inserts loaded on the tool. Orientating the position of the flutes and inserts for achieving overlapping fields of cutting is known to those of ordinary skill in the art. Although those skilled in the art readily know the optimum geometry for gullet configuration in relation to tool diameter to maximize the formation of tight chip formation and removal, the orientation of the chip gullet to optimize the number of effective teeth per tool is not known.

Figure 3:
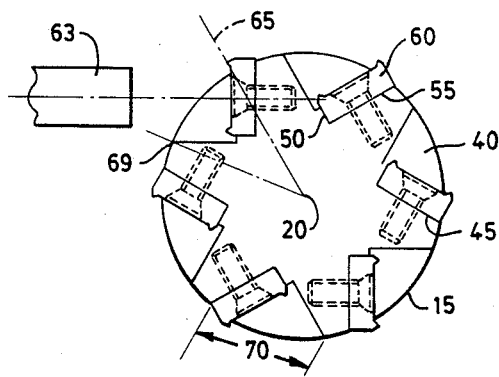
FIG. 3 illustrates an axial view as in FIG. 2 with inserts mounted in pockets.

Referring to FIG. 3, each pocket has at least two adjoining abutment faces 50 which further adjoin a seating face 55 positioned generally normal thereto. A plurality of indexable inserts 60 are positioned within the pockets 45. In one embodiment each seating face is bored and tapped for receipt of threaded screws which traverse the insert forcing it securely against the abutment faces.

Chip gullets 40 are milled into body 10 by conventional milling techniques such as the use of end mill 63. An imaginary plane containing line 65, hereafter referred to as the reference plane, extends normal to axis 20 and intersects a point tangent to periphery 15 at the cutting edge and a second imaginary line 67 also normal to axis 20, which extends to the point of entry 69 of chip gullet 40 on periphery 15. The imaginary lines establish the boundaries for measuring the chordal distance 70 of the chip gullet. As illustrated in FIG. 1, the traditional method of milling chip grooves and pockets, where the pocket seating faces for the inserts are positioned on the reference plane 65, incorporate significantly larger chordal lengths 70 thereby limiting the number of potential chip gullets per tool. FIG. 2, illustrates chordal lengths which allow for 50 percent more effective teeth per tool. For example, a 2 inch diameter end mill stocked with half inch tungsten carbide inserts of generally square form, available from GTE Valenite under the trade name SPG 422, allow for the placement of four inserts or two effective teeth per end mill tool. As illustrated in FIG. 1, the inserts 60 have neutral or zero radial rake. The inserts, as illustrated in FIG. 2,4 of the present invention, having planar parallel top 75 and bottom faces 80, are oriented on the reference plane 65 and have a chord length 70 of 1.12 inches. Referring to FIG. 2, using a two inch diameter body, with the same half inch inserts of FIG. 1, the chord length 70 is about 0.781 inches or about 1.5 time shorter. The shorter chord length allows for the placement of six half inch inserts or three effective cutting teeth per tool.

Figure 4:
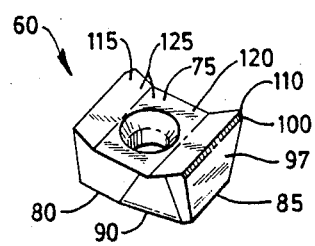
FIG. 4 illustrates a perspective view of an insert of FIG. 3.

Referring again to FIG. 3, the rake angle of pocket seat 45 is positioned above the reference plane 65 and is therefore negative. Traditional flat faced inserts, seated therein would prove minimally effective in milling difficult to machine materials. Insert 60, as illustrated in FIG. 4 above, provides a positive rake insert with positive axial rake and negative, neutral or positive radial rake depending upon the application.

The term "rake" is generally known in the art and constitutes the angular relationship measured between a reference plane and a reference face of the insert. The reference plane as discussed above, passes through the cutter body central line axis and the insert's cutting corner. The reference face sometimes referred to as rake face or third surface 115, hereafter, is the face that sees the work piece and is dependent of the direction of cutter rotation.

The inserts radial rake is the angle formed by the reference plane and the rake face as measured in the plane perpendicular to the cutter body axis.

Radial rake is defined as positive where the rake face forms an acute angle with respect to the reference plane such that the rake face slopes away from the direction of cutter rotation when applied to the workpiece. Radial rake is defined as negative where the rake face forms an obtuse angle with th reference planes and slopes toward the direction of cutter rotation.

The inserts axial rake connotes the angle formed between the reference plane and the rake face measured in a plane perpendicular to the radius of the cutting body, at the working cutting corner.

As illustrated in FIGS. 4, inserts 60 comprise top and bottom faces 75,80. Although illustrated as being diamond top and square bottom in form, those skilled in the art will recognize that a variety of forms are included in the present invention. In one embodiment, the top face 75 is separated from the bottom 80 by at least two pair of opposite side surfaces wherein one pair comprises end clearance surfaces 90, and the other side flank surfaces 85. In one embodiment, each side end clearance surface adjoins at least two side flank surfaces forming both acute and obtuse angles. Each of the side flank surfaces 85 further includes a first surface 97 which intersects the bottom face 80 at a 90 degree angle and a second surface 100 which adjoins the first surface 97 at an obtuse angle 105. The second surface 100 extends inwardly toward the top face 75 forming an acute angled cutting edge 110. The top face 75 is generally segmented with two inclined third surfaces 115 extending from a planar central face 120. The third surfaces 115 form an obtuse angle 125 with respect to the central face and lie either on or slightly below the reference plane 65 of FIG. 3 to provide a neutral to positive rake cutting edges.

Figure 5:
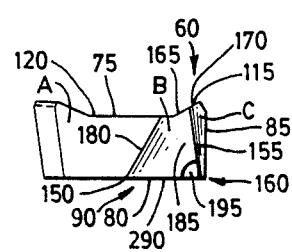
FIG. 5 illustrates a side view of the insert illustrated in FIG. 4.

Referring to FIG. 5, end clearance surfaces 90 of inserts 60 each include three sections A,B,C extending between parallel side flank surfaces 85. Section B adjoins sections A and C at obtuse angles 150,155. Section A is positioned generally normal to bottom face 80 and at an obtuse angle 157 with respect to side flank surface 85. Obtuse angle 150 provides heel clearance for the insert flank corners 160 during operation. In one embodiment, the sections B and C angle inwardly producing diagonally opposite radiused surfaces at the intersection with top face 75 and third surface 115. Although the length of the radius for surface may vary depending on the size of the insert, the optimization of the radius dimension will be readily known to those of ordinary skill in the art. Alternatively, as illustrated, segments 165, 170 may be formed at the intersection of third surface 115, and planar sections B and C. The intersection of sections A and B form a line which extends from bottom face 80 to top face 75 at an inclined angle 180 of about 110 to about 130 degrees with respect to the plane containing bottom face 80. The intersection of sections B and C form a line 185 whose angle declines from third surface 115 away from section A and toward bottom face 80 forming an obtuse angle with respect to bottom face 80. Section B forms an acute angle 195 with respect to line 290 formed by the intersection with bottom face 80.

Section B is formed by grinding at about 70 degrees acute with respect to a plane containing central face 120 and 90 degrees with respect to side flank surface 85.

Section C is formed by grinding at about 70 degrees acute with respect to a plane containing central face 120 and 135 degrees with respect to side flank surface 85.

The beforementioned dimensions and angles are presented by way of example for a half inch tungsten carbide insert with two indices and not by way of limitations to the present invention. Those of ordinary skill in the art will recognize other features and embodiments from the objects, drawings, and description presented above for invention as claimed. For example various securing means may be employed including clamps, pins, and brazing to name a few. Although one particular insert geometry is exemplified, other geometries are contemplated including triangular, trigon, spherical and rhomboid.

I claim:

1. An indexable insert polygonal in form comprising
parallel top and bottom faces,
said bottom face being substantially square and said top face being substantially diamond shaped,
at least one pair of oppositely disposed end clearance surfaces and at least one pair of oppositely disposed side flank surfaces adjoining said end clearance rake surfaces and separating said top and bottom faces,
said top face intersecting said end clearance side surfaces to form two pair of substantially diagonally opposed flank corner sections,
said side flank surfaces adjoining said end clearance surfaces at an obtuse angle,
each of said side flank surfaces having a first surface adjacent said bottom face and a second surface adjacent the first surface,
said second surfaces inclined toward said top face sweeping out an obtuse angle with respect to said first surface,
said top face being segmented and comprising a pair of planar third surfaces which extend away from the top face forming generally obtuse angles with respect to said top face,
said second surfaces intersecting said third surfaces at acute angles to form cutting edges with positive axial rake angles,
said end clearance surfaces comprising planar sections A, B, and C,
section A being separated from section C by section B,
said A section positioned normal to said said bottom face and obtuse to said side flank surface,
said B section angling toward said top face forming an obtuse angle with respect to said bottom face and said A section to provide clearance for said flank corner during operation,
said B and C sections forming, a segmented edge on intersection with said third surfaces,
said edge positioned at substantially diagonal corners of said top face,
said A section intersecting said B section to form a line which extends from said bottom face to said top face at an obtuse angle in a plane containing section A,
said B section intersecting said C section to form a line whose angle declines from a point on said third surface toward said bottom face to form an an acute angle with respect to the line of intersection of said section B and said bottom face,
said C section intersecting said first surface and said second surface at obtuse angles with respect thereto and an acute angle with respect to said bottom face.

2. The insert of claim 1 wherein said obtuse angle formed by the intersection of said flank surfaces and said end clearance surfaces is about 110 degrees.

3. The insert of claim 2 wherein said obtuse angle formed by said third surface and said top face is between about 150 degrees to about 170 degrees.

4. The insert of claim 3 wherein said cutting edges include a positive axial rake angle of between about 5 degrees to about 20 degrees and said acute angle formed thereby is from about 70 degrees to about 85 degrees.

5. The insert of claim 4 wherein said acute angle formed by said B section and said top face is about 70 degrees.

6. The insert of claim 5 wherein said acute angle formed by the intersection of section C and said first surface of said side flank surface is about 130 degrees with respect to said side flank surface.

7. An indexable insert comprising
parallel top and bottom faces,
said bottom face being substantially square and said top face being substantially diamond shaped,
at least one pair of oppositely disposed end clearance surfaces and at least one pair of oppositely disposed side flank surfaces adjoining said end clearance surfaces and separating said top and bottom faces,
said top face intersecting said side surfaces to form two pair of substantially diagonally opposed flank corner sections,
said side flank surfaces adjoining said end clearance surfaces at an obtuse angle of about 110 degrees,
each of said side flank surfaces having a first surface adjacent said bottom face and a second surface adjacent the first surface,
said second surface inclined toward said top face sweeping out an obtuse angle with respect to said first surface,
said top face being segmented and comprising a pair of planar third surfaces which extend away from the top face forming generally obtuse angles with respect to said top face of about 150 degrees,
said second surfaces intersecting said third surfaces at acute angles to form cutting edges with a positive axial rake angles of about 10 degrees,
said end clearance comprising planar sections A, B, and C,
section A being separated from section C by section B,
said A section positioned normal to said said bottom face and obtuse to said first flank surface,
said B section angling toward said top face forming an acute angle of about 70 degrees with respect to said top face,
said A section intersecting said B section to form a line which extends from said bottom face to said top face at an inclined angle of about 120 degrees,
said B section intersecting said C section to form a line whose angle declines from said third surface at an obtuse angle with respect to said bottom face,
said C section intersecting said first side flank surface to form an angle of about 130 degrees.

* * * * *